US006376820B1

(12) United States Patent
Butterfield et al.

(10) Patent No.: US 6,376,820 B1
(45) Date of Patent: Apr. 23, 2002

(54) TWO AXIS GIMBAL HAVING A SPHERICAL BEARING

(75) Inventors: Ordie Dean Butterfield, Sumner; Robert W. Turner, Federal Way, both of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/536,327

(22) Filed: Mar. 24, 2000

(51) Int. Cl.[7] ................................................ G01C 21/02

(52) U.S. Cl. ................................ 250/203.1; 250/231.18

(58) Field of Search ........................... 250/203.1, 203.6, 250/231.12, 231.18, 231.14; 356/139.01, 149; 244/3.23, 3.18, 173; 342/46, 42

(56) References Cited

U.S. PATENT DOCUMENTS 3,554,466 A 1/1971 Lloyd
3,662,608 A 5/1972 Vold
4,015,905 A 4/1977 Lloyd
4,389,028 A * 6/1983 Kalivretenos et al. ...... 244/3.21
4,491,388 A 1/1985 Wood
4,662,727 A 5/1987 Griffin
4,772,892 A 9/1988 Payelian et al.
5,115,355 A 5/1992 Dunn
5,219,132 A 6/1993 Beckerleg et al.

* cited by examiner

*Primary Examiner*—Que T. Le
(74) *Attorney, Agent, or Firm*—Alston & Bird LLP

(57) ABSTRACT

A two axis gimbal is provided comprising a support structure, a spherical bearing mounted to the support structure and defining a channel therethrough, and a shaft extending through the channel. The gimbal may also include a reflector connected to the shaft. A drive mechanism, such as a spherical motor, is mounted to the support structure and is adapted to rotate the shaft in two orthogonal axes, i.e., pitch and roll. Power and signal cables are connected to the drive mechanism. The gimbal of the present invention may also include pairs of sensors and sensor triggers for monitoring the position of the shaft and the reflector relative to the pitch and roll axes. The design of the two axis gimbal of the present invention permits the cables to remain stationary during operation of the gimbal.

15 Claims, 3 Drawing Sheets

TWO AXIS GIMBAL HAVING A SPHERICAL BEARING

FIELD OF THE INVENTION

This invention pertains generally to communications and guidance systems, and more particularly to a two axis gimbal for controlling a mirror or radar dish in such a system.

BACKGROUND OF THE INVENTION

Two axis gimbals are used in many applications where a telescope, mirror, or some other instrument has to point or track in two axis space. Such applications include directing lasers from one satellite to another satellite, or accurately positioning a radar dish. Typically, four or six bearing gimbals with complex support systems are used to provide the two degrees of freedom. In addition, gimbals may be required to track in relatively small increments, although gimbals suffer from a number of problems in precision applications.

Two of the more difficult problems with the precision positioning provided by two axis gimbals are reduction of pointing accuracy caused by break away torque, or "stiction," in the motor bearings of the gimbal, and high friction and stiffness associated with the movement of various power and signal cables associated with the gimbal. In precision operations, these restricting forces cause the motor to produce an energy peak, which typically causes the motor to overshoot a desired position. The moving cables also create control and reliability problems due to the stiffness and friction as described above, which change as a function of temperature, time, positioning, and other factors.

Several methods have been developed to reduce the effects caused by the cables. One such method in which the gimbal includes a yoke and a shaft adapted to controllably move relative to the yoke is to cluster the cables along the sides of the yoke. This method, however, provides an undesirably high level of resistance during the operation of the gimbal, with the physical properties of the cables creating varying and unpredictable forces that must be overcome by the gimbal motor. Furthermore, this technique can create hardware interference problems and cause pronounced cable fatigue. For example, cables can become caught in nearby components and may encounter more bending cycles during operation. Still other gimbal designs leave the cables unconstrained, allowing the cables to hang freely from the gimbal. This design, however, can create dynamic loading problems. More specifically, moving cables provide inertia loads that typically change in magnitude with respect to position. Thus, these loads can cause control problems as the gimbal is moved from one position to another.

Another concern with current gimbals is the high number of total parts, which increases production costs, mass, and complexity, while reducing overall product reliability. Two axis gimbals in particular require a large number of parts and a correspondingly large assembly time. As described above, two axis rotation is typically provided by a plurality of bearings, wherein each bearing must be preloaded to a high tolerance to insure proper bearing and shaft alignments. Such gimbals disadvantageously require large amounts of labor time to install, as well as increasing the total part count and overall mass. The latter factor becomes increasingly important when considering use in space applications, where slight weight differences have a dramatic effect on launch costs.

SUMMARY OF THE INVENTION

The two axis gimbal of the present invention provides a gimbal having extremely low bearing stiction, nonmoving cables, and a reduced number of total parts. The present invention is applicable for many types of gimbaled instruments, but is particularly adapted for precision applications since a number of limitations inherent in conventional gimbals have been overcome. The two axis gimbal of the present invention includes a spherical bearing, such as a miniball spherical bearing, having extremely low stiction that accommodates the two axis motion. The bearing allows roll, pitch, and yaw motion, although the gimbal is typically designed to exclude yaw motion. The gimbal also includes a shaft that runs through the bearing. The inner race of the bearing therefore allows the shaft to move, typically in roll and pitch, while the outer race of the bearing is fixed to a support structure. The gimbal also includes a drive mechanism, such as a spherical motor, for rotating the shaft within the spherical bearing relative to the fixed support structure. In embodiments in which the gimbal also includes a reflector mounted to the shaft, the drive mechanism serves to rotate the reflector about two orthogonal axes, i.e., pitch and roll.

The gimbal can also include a counterbalance to balance the gimbal. In a preferred embodiment, the counterbalance is eccentric and movably attached near one end of the shaft. The counterbalance may be rotated around the shaft or moved along the shaft to balance the gimbal in the pitch and roll axes. In addition, the gimbal can include pairs of sensors and sensor triggers for monitoring the position of the shaft and, in turn, the reflector relative to the pitch and roll axes.

The design of the gimbal of the present invention permits the cables that connect the drive mechanism to the power source to remain stationary during operation of the gimbal. As a result, the stiffness and friction created by attempting to move the cables of current gimbals is eliminated. Moreover, the spherical motor and bearing combination greatly reduces the overall number of parts, mass and volume, in some cases up to 50%.

BRIEF DESCRIPTION OF THE DRAWINGS

While some of the objects and advantages of the present invention having been stated, other will appear as the description proceeds when taken in conjunction with the accompanying drawings, which are not necessarily drawn to scale, wherein.

DETAILED DESCRIPTION OF THE INVENTION

Figure 1:
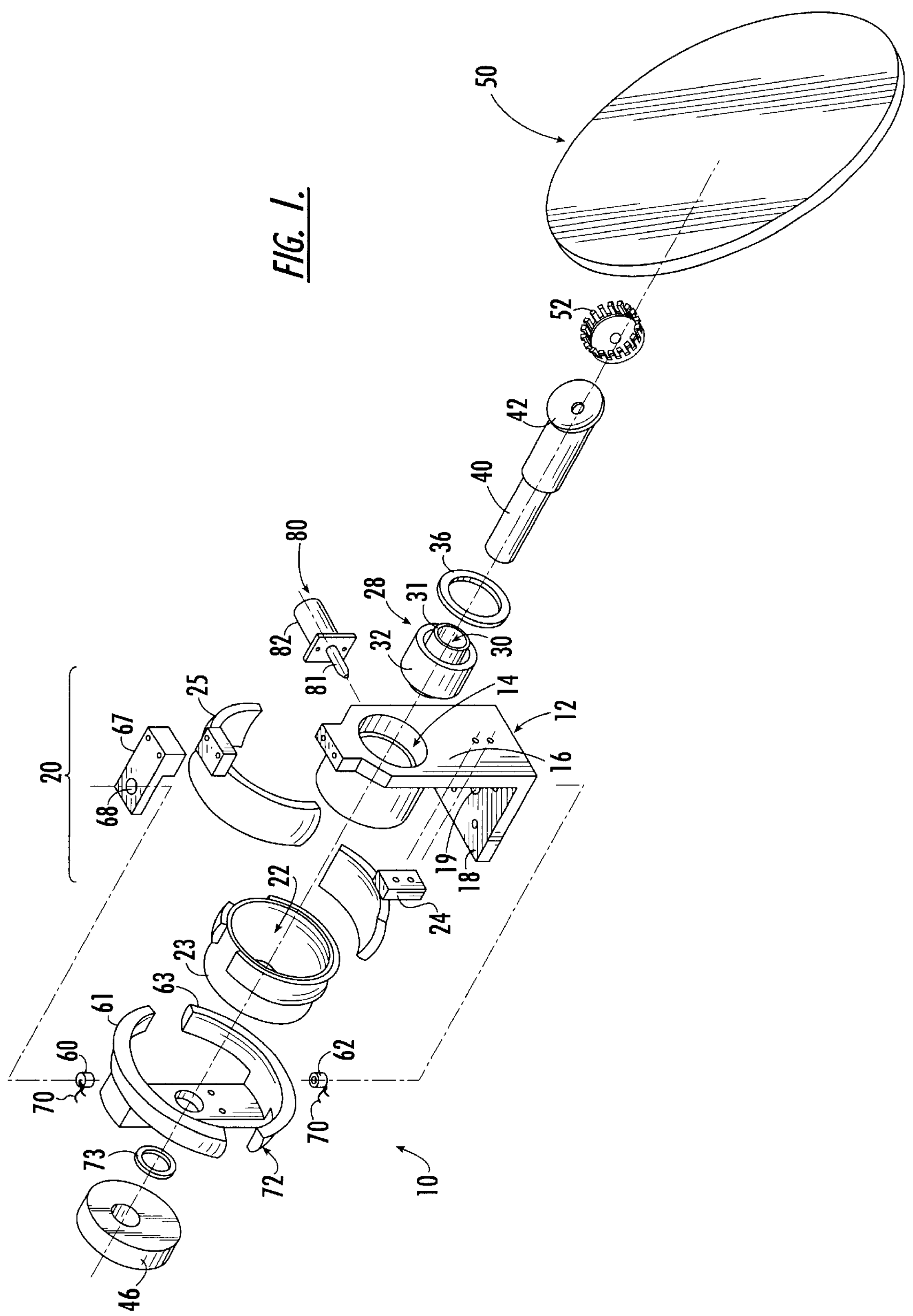
FIG. 1 is an exploded perspective view of a two axis gimbal according to one embodiment the present invention.

The present invention provides a two axis gimbal that may be used in many applications, such as space applications or terrestrial applications. Referring to FIG. 1, the two axis gimbal 10 of one embodiment of the present invention comprises a support structure 12 having an upstanding portion 16 that defines an annular channel 14. The gimbal of this embodiment also includes a spherical motor 20, such as a two-axis spherical segmented motor, mounted to the support structure 12, wherein the spherical motor 20 defines an annular channel 22 therethrough which is coaxial with the annular channel 14 defined by the support structure 12. The gimbal further includes a spherical bearing 28, such as a miniball spherical bearing, connected to the support structure 12 and extending through the annular channel 14 defined through the support structure 12. The bearing 28 also defines an annular channel 30 that is coaxial with the annular channel 14 defined by the support structure 12.

As shown in FIG. 1, the gimbal also includes a shaft 40 extending through the annular channel 30 defined by the bearing 28 and capable of being moved in two axes, such as pitch and roll axes, relative to the fixed support structure 12. The gimbal also can include a counterbalance 46 movably attached near one end of the shaft 40. In the preferred embodiment shown in FIG. 1, the gimbal includes a mirror 50, typically a lightweight mirror, connected to the other end of the shaft 40. The mirror 50 is typically mounted to the shaft 40 using a flexured mirror mount 52, although other fasteners or adhesives may be used. The embodiment of the gimbal shown in FIG. 1 also includes a roll axis sensor 60 and pickoff 61, and a pitch axis sensor 62 and pickoff 63 to detect the relative position of the shaft 40 in both the roll and pitch axes at a given time, as explained more fully below.

The support structure 12 may be formed by known manufacturing methods using metal or other suitable material to give rigid support to the rest of the gimbal 10. The annular channel 14 is defined by the upstanding portion 16 of the support structure 12, and is preferably spaced a distance above the base portion 18 of the support structure 12 so that a portion of the spherical motor 20 can be connected using bolts or other fasteners (not shown) to the upstanding portion 16 of the support structure 12 between the annular channel 14 and the base portion 18. As will be described hereafter, other portions of the spherical motor 20 can be attached to the upstanding portion 16 of the support structure 12 on the opposite side of the annular channel 14 from the base portion 18.

Figure 2:
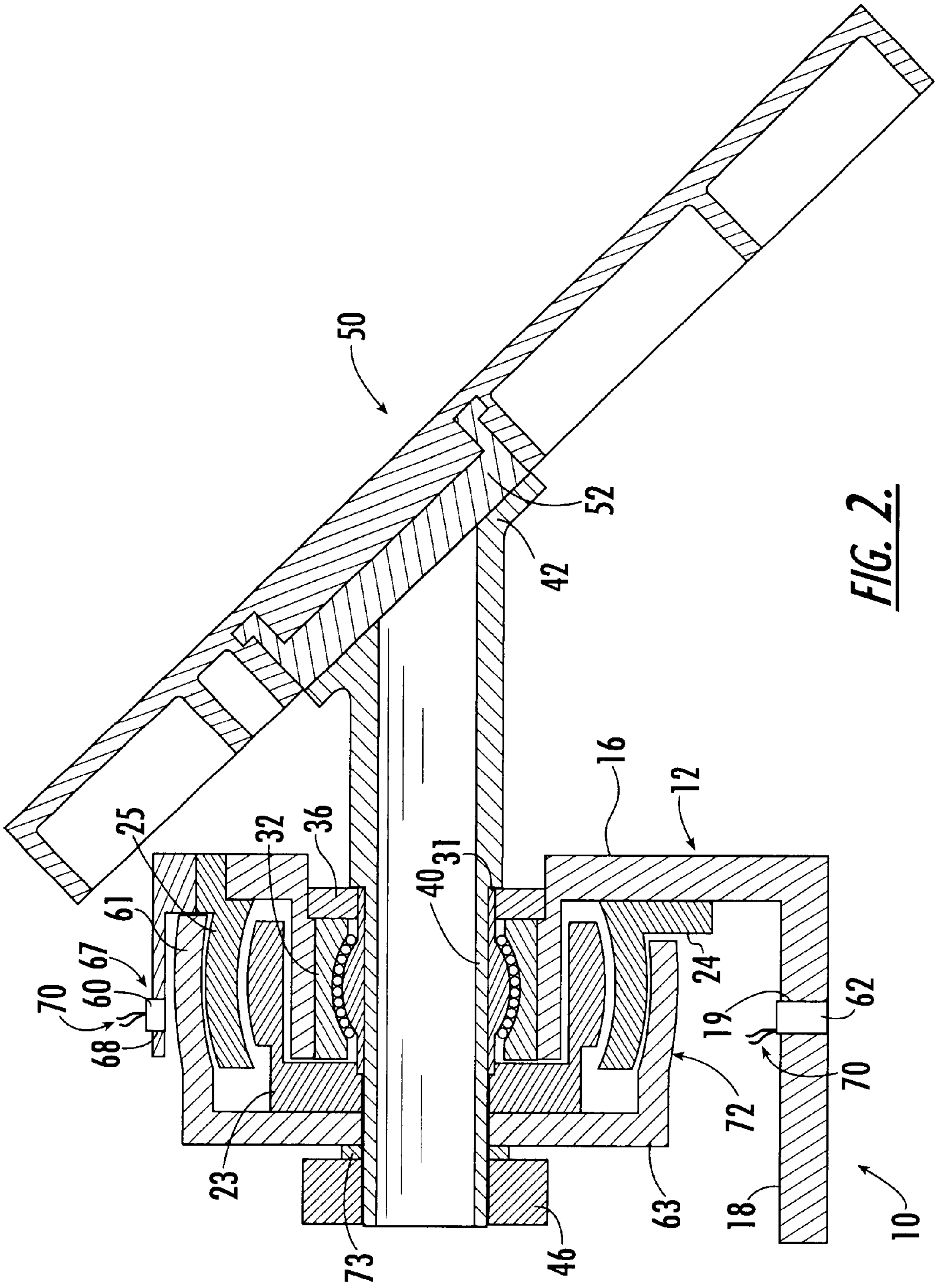
FIG. 2 is a cross-sectional view of the two axis gimbal of FIG. 1.

One embodiment of the bearing 28 that extends through the annular channel 14 of the support structure 12 is a miniball spherical bearing as described in U.S. Pat. No. 2,983,558, which is herein incorporated by reference. Although the spherical bearing can have different amounts of radial play, typical radial play is 15–30 millionths of an inch. The bearing 28 typically allows roll, pitch, and yaw motion. In applications where yaw motion is undesirable, the bearing can prevent yaw motion by a set of springs (not shown) without affecting performance in the pitch and roll axes. In one embodiment, the inner race 31 of the bearing 28 is attached to the shaft 40, which extends through the annular channel 14 defined by the bearing 28. Alternatively, the shaft 40 and inner race 31 may also be formed as an integrated unit. In either embodiment, the inner race 31 allows movement of the shaft 40, while the outer race 32 is fixed to the support structure 12, typically at a location within the annular channel 14. As shown in FIGS. 1 and 2, the gimbal can include a bearing retainer 36 to prevent the bearing 28 from escaping from within the annular channel 14.

In addition, the gimbal can include temperature control and limit switches (not shown) depending on the application and environment. More specifically, temperature control for the bearing 28 may be desirable in applications where a wide operating temperature range is present. The temperature of the bearing 28 may be controlled by placing a cooler (not shown), such as a thermoelectric cooler, in close proximity or mounted to the outer race 32 of the bearing 28 so that thermal energy is conducted to and from the bearing, depending on whether the bearing is being heated or cooled, respectively. Limit switches may be desirable for some applications to prevent the shaft 40 from inadvertently moving out of a desired range of control. For example, a software or other type of error may cause the shaft 40 and any attachments thereto to begin to move out the desired control range. A limit switch may be positioned to detect this movement and send stop signals to the motor. In one embodiment, the roll and pitch axes have one limit switch each.

In one advantageous embodiment, the shaft 40 is connected to a mirror 50 or other device, such as a radar dish, useful in reflecting or relaying signals. As shown in FIGS. 1 and 2, one end of the shaft 40 is angled and defines a mounting surface 42, wherein the mounting surface 42 is typically between 10–80 degrees. According to the present invention, the mirror 50 is mounted to mounting surface 42 of the shaft 40, preferably using a flexure type mirror mount 52, although fasteners or an adhesive may also be used. By controllably positioning the shaft within the spherical bearing, the mirror can therefore be controllably positioned in at least two axes, i.e., pitch and roll.

In this regard, the motor 20 controls the movement of the shaft 40 in the roll axis and the pitch axes, wherein the shaft 40 may be rotated in the roll axis up to +/−180 degrees, and in a preferred embodiment +/−170 degrees, and may be rotated in the pitch axis until being constrained by the outer race 32 of the spherical bearing 28, preferably having a range of +/−10 degrees. As will be apparent, the motor 20 is supplied power and control signals from a power and signal source 69 via an amplifier 66 by electrical cables 70. Advantageously, the cables 70 are mounted to the upstanding portion 16 such that the cables 70 do not have to move. As such, the cables 70 transfer no stiffness and friction to any moving parts in the gimbal 10.

The spherical motor 20 preferably has only a few parts. Specifically, the motor 20 typically comprises a motor magnet assembly 23, roll axis motor stator 24, and pitch axis motor stator 25. In addition, temperature control and limit switches (not shown) may be provided depending on the application and environment. The motor magnet assembly 23 is generally a ring-like structure having one or more magnets mounted about its circumference. The motor magnet assembly 23 also defines the channel 22 through which a portion of the shaft 40 passes. The pitch axis motor stator 25 and roll axis motor stator 24 are typically semicircular structures that are connected to the support structure 12 with bolts or other suitable fasteners (not shown). Once mounted to the support structure, the pitch axis motor stator 25 and the roll axis motor stator 24 form a channel, preferably cylindrical and having an inside surface dimension approximately equal to the outer surface dimension of the motor magnet assembly 23. The motor magnet assembly 23 is therefore disposed within the channel formed by the stators 24, 25 and is capable of rotating therein. The motor magnet assembly 23 is attached to the shaft 40, such that as the motor magnet assembly rotates within the channel formed by the stators 24, 25, the shaft 40 is rotated accordingly.

Although not necessary for the practice of the present invention, the gimbal can also include a gimbal lock 80 comprising a locking shaft 81 and a drive mechanism 82, which may be one of many drive mechanisms known in the art. In particular, the locking shaft 81 passes through a clearance hole (not shown) in the upstanding portion 16 and engages a hole (not shown) in the shaft 40. The lock 80 is desirable for preventing the shaft 40 and the mirror 50 from moving during transportation, and is disengaged when the gimbal 10 is in operation.

Figure 3:
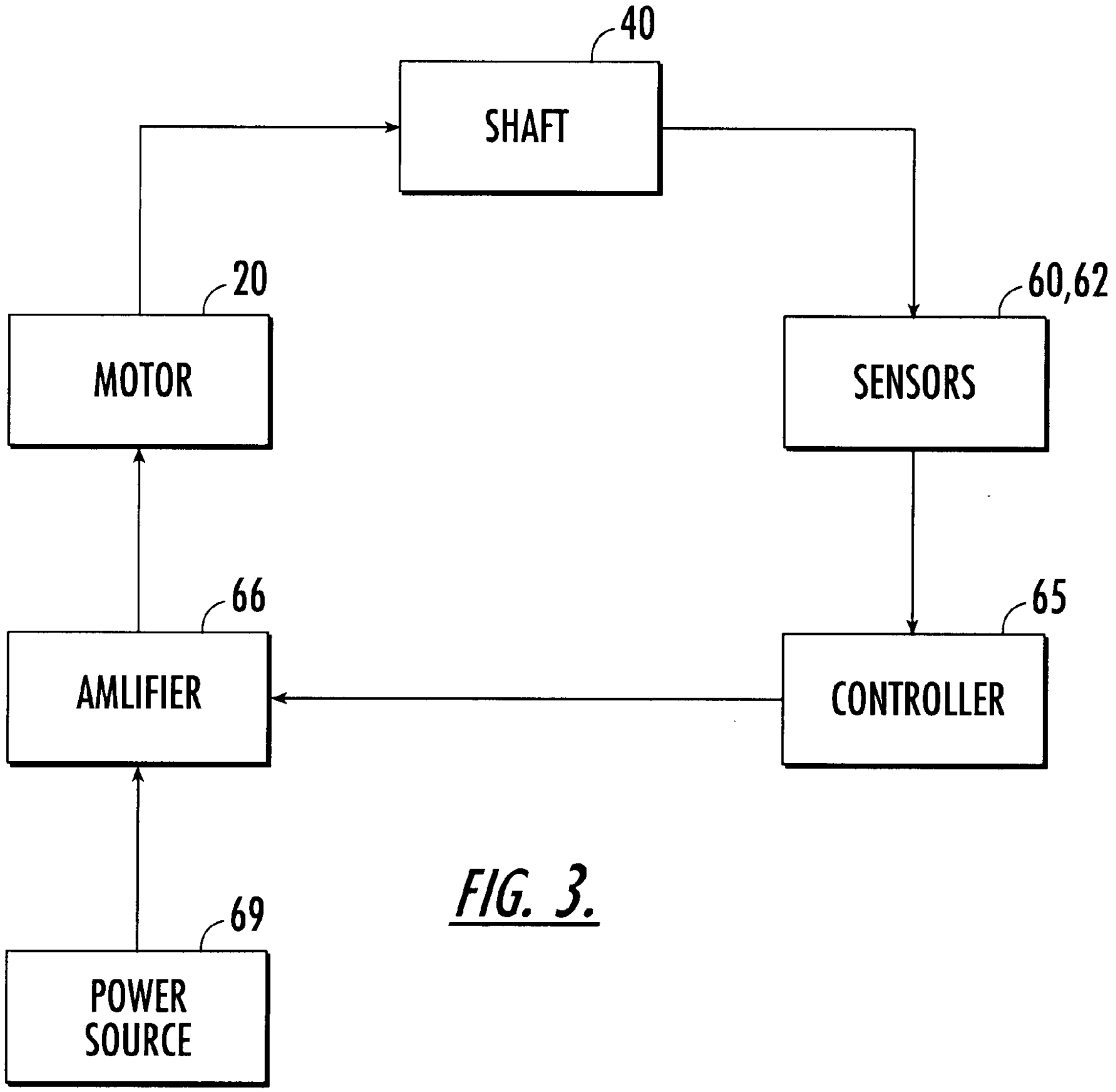
FIG. 3 is a block diagram detailing the operation of the two axis gimbal of one embodiment of the present invention.

In one advantageous embodiment, the shaft 40 further extends through a roll and pitch axis sensor pickoff unit 72. In one embodiment, the sensor pickoff unit 72 is removably affixed to the shaft 40 by way of a retainer ring 73 and includes a roll axis pickoff portion 61 and pitch axis pickoff portion 63. The pitch axis pickoff 63 is a truncated sphere formed of metal and having a centroid that is offset slightly from the pitch axis, but that is on the roll axis of the shaft 40. As the shaft 40 moves in the pitch axis, the pickoff 63 will change in distance from the pitch axis sensor 62, which is mounted to the support structure 12. In one embodiment, for example, the base portion 18 of the support structure 12 defines a hole 19 therethrough so that the pitch axis sensor 62 is operatively positioned within the hole 19 and adjacent the pitch axis sensor pickoff 63. As such, the capacitance between the pitch axis sensor 62 and the pitch axis sensor pickoff 63 changes as the shaft 40 moves along the pitch axis. As shown in FIG. 3, the sensor 62 signals a controller 65, and the pitch angle can be determined based on the capacitance between the pitch axis sensor 62 and the pitch axis sensor pickoff 63. Importantly, when the shaft 40 rotates about the roll axis, the distance between the pitch axis pickoff 63 and the pitch axis sensor 62 does not change due to the centroid of the pickoff 63 being located on the roll axis. Therefore, the pitch axis sensor 62 is insensitive to roll motion.

By a similar arrangement, the roll axis position is detected by the roll axis sensor 60 and roll axis pickoff 61 combination, wherein the roll axis pickoff 61 is a truncated sphere formed of metal and having a centroid that is offset slightly from the roll axis, but that is on the pitch axis. As the shaft 40 moves in the roll axis, the pickoff 61 will change in distance from the roll axis sensor 60, which is mounted to the support structure 12. In one embodiment, for example, the roll axis sensor 60 is mounted to a sensor mount 67, wherein the sensor mount 67 is mounted to the pitch axis motor stator 25. The sensor mount 67 defines a hole 68 therethrough, so that the roll axis sensor 60 is operatively positioned within the hole 68 and adjacent the roll axis pickoff 61. As such, the capacitance between the roll axis sensor 60 and the roll axis pickoff 61 changes as the shaft 40 rotates around the roll axis. The roll axis sensor 60 signals the controller 65, and the roll position can be determined based on the capacitance between the roll axis sensor 60 and the roll axis pickoff 61. Importantly, when the shaft 40 rotates in the pitch axis, the distance between the roll axis pickoff 61 and the roll axis sensor 60 does not change due to the centroid of the pickoff 61 being located on the pitch axis. Therefore, the roll axis sensor 60 is insensitive to pitch motion.

As described, the sensors 60, 62 may be capacitive sensors that are available commercially. Such sensors are capable of measuring a change in capacitance to an accuracy of ten millionths of an inch. However, the gimbal can include other types of sensors. For example, the gimbal may include sensors comprising a mirror, an LED directed toward the mirror, and a position sensitive detector (PSD). In one embodiment, light from the LED passes through a lens and is directed toward the mirror that is mounted on an end of the shaft 40 opposite the mirror 50. The light is reflected off the mirror onto the PSD. The signal from the PSD is measured against desired roll and pitch axes positions by the controller 65.

To balance the gimbal 10 about the spherical bearing 28, at least one counterbalance is typically movably attached near one end of the shaft 40. In a preferred embodiment, the counterbalance comprises a single eccentric counterbalance 46. By rotating the counterbalance 46 around the shaft 40, the roll axis is balanced. By moving the counterbalance 46 along the shaft 40, the pitch axis is balanced.

In operation, the counterbalance 46 balances the gimbal in the roll and pitch axes. The counterbalance 46 comprises a weighted object having a mass capable of balancing the shaft 40 and a mirror 50 or other object attached to the shaft 40. The counterbalance 46 is removably affixed to the shaft 40, and preferably has an eccentric axis in relation to the longitudinal axis of the shaft 40. Once the counterbalance 46 is removably affixed to the shaft 40 using a mounting tool (not shown) so that the shaft 40 and objects, such as a mirror 50, attached to the shaft are balanced about the center of the spherical bearing 28, the gimbal remains balanced in the roll and pitch axes. The counterbalance may have to be adjusted to re-balance the gimbal if objects are later added or removed from the gimbal.

Referring to FIG. 3, the operation of the present invention provides a working relationship for the amplifier 66, motor 20, shaft 40, sensors 60, 62, and controller 65. In operation, the amplifier 66 feeds a current to the motor 20 to rotate the shaft 40 to an initial roll and pitch axis position. The sensors 60, 62 detect the position of the shaft 40 and feed signals to the controller 65 to determine the roll and pitch axis position. Based on a detected position and a desired position, the controller 65 can refine the position of the shaft 40 to come closer to the intended position. The controller 65 also can provide the shaft position to an operator or transmit the information to another device, such as a display or memory device for storage.

The two axis gimbal of the present invention provides a gimbal useful in many applications, but is particularly adapted to for precision applications, such as space applications. Advantageously, the design of the two axis gimbal of the present invention includes a spherical bearing and a drive mechanism, such as a spherical motor, which provide extremely low bearing stiction and a reduced number of total parts. The design of the two axis gimbal of the present invention permits the cables providing power and signal to the gimbal to remain stationary during operation of the gimbal, which thereby provides precise positioning and pointing accuracy as well as improved reliability.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purpose of limitation.

What is claimed is:

1. An two axis gimbal, comprising:

a support structure;

a spherical bearing mounted to said support structure, said bearing defining a channel therethrough;

a shaft having first and second ends, said shaft extending through said channel;

a reflector connected to said first end of said shaft; and a drive mechanism mounted to said support structure and operably connected to said shaft, said drive mechanism adapted to rotate said shaft and said reflector about two orthogonal axes.

2. A two axis gimbal according to claim 1, further comprising at least one cable connected to said drive mechanism, said at least one cable being capable of remaining stationary during operation of said two axis gimbal.

3. A two axis gimbal according to claim 1, further comprising at least one sensor mounted on said support structure, wherein said at least one sensor obtains a measure indicative of a relative position of said reflector.

4. A two axis gimbal according to claim 3, further comprising at least one sensor trigger adapted for movement with said shaft, said at least one sensor trigger being in operational proximity to said at least one sensor.

5. A two axis gimbal according to claim 1, wherein said drive mechanism is a spherical motor.

6. A two axis gimbal according to claim 1, further comprising an eccentric counterbalance movably connected to said second end of said shaft.

7. A two axis gimbal, comprising:

a support structure;

a spherical bearing mounted to said support structure, said bearing defining a channel therethrough;

a drive mechanism mounted to said support structure;

a shaft having first and second ends, said shaft extending through said channel; and at least one cable electrically connecting said drive mechanism to a power source, said at least one cable being capable of remaining stationary during operation of the two axis gimbal.

8. A two axis gimbal according to claim 7, further comprising at least one sensor mounted on said support structure, wherein said at least one sensor is adapted for obtaining a measure indicative of a relative position.

9. A two axis gimbal according to claim 8, wherein said at least one cable also electrically connects said at least one sensor to said power source.

10. A two axis gimbal according to claim 7, further comprising an eccentric counterbalance movably connected to said second end of said shaft.

11. A two axis gimbal according to claim 7, wherein said drive mechanism is a spherical motor.

12. A two axis gimbal, comprising:

a support structure;

a spherical bearing mounted to said support structure, said bearing defining a channel therethrough;

a spherical motor mounted to said support structure;

a shaft operably connected to said spherical motor, said shaft having first and second ends, said shaft extending through said channel;

a reflector connected to said first end of said shaft;

at least one sensor mounted on said support structure; and a counterbalance mounted to said second end of said shaft.

13. A two axis gimbal according to claim 12, wherein said at least one sensor obtains a measure indicative of a relative position of said reflector.

14. A two axis gimbal according to claim 13, further comprising at least one cable connected to said drive mechanism, said at least one cable being capable of remaining stationary during operation of said two axis gimbal.

15. A two axis gimbal according to claim 13, further comprising at least one sensor trigger adapted for movement with said spherical bearing, said at least one sensor trigger being in operational proximity to said at least one sensor.

* * * * *